United States Patent [19]
Lessard et al.

[11] Patent Number: 4,897,812
[45] Date of Patent: Jan. 30, 1990

[54] GRAPHICS ADAPTER

[75] Inventors: Paul A. Lessard, Merrimack, N.H.; John F. McDonald, Leominster, Mass.

[73] Assignee: Wang Laboratories, Inc., Lowell, Mass.

[21] Appl. No.: 878,450

[22] Filed: Jun. 25, 1986

[51] Int. Cl.[4] .......... G06F 3/153
[52] U.S. Cl. .......... 364/900; 340/798; 364/927.4; 364/967.1; 364/926.93
[58] Field of Search .......... 340/723, 747, 798, 720; 364/200 MS File, 900 MS File

[56] References Cited

U.S. PATENT DOCUMENTS

| | | | |
|---|---|---|---|
| 3,614,743 | 10/1971 | Ruben | 364/900 X |
| 3,895,375 | 7/1975 | Williams | 340/723 |
| 4,016,544 | 4/1977 | Morita et al. | 364/900 |
| 4,386,410 | 5/1983 | Pandya et al. | 364/521 |
| 4,491,834 | 1/1985 | Oguchi | 340/723 X |
| 4,586,036 | 4/1986 | Thomason et al. | 340/720 |
| 4,641,262 | 2/1987 | Bryan et al. | 364/900 |
| 4,672,575 | 6/1987 | Stephens | 364/900 |
| 4,673,929 | 6/1987 | Nelson et al. | 340/793 |

OTHER PUBLICATIONS

Hoffman, T., "Graphic Enhancement", PC Tech. Journal, vol. 3, No. 4, Apr. 1985, pp. 58-80.

*Primary Examiner*—Thomas M. Heckler
*Attorney, Agent, or Firm*—Michael H. Shanahan; Gordon E. Nelson

[57] ABSTRACT

A graphics adapter of the type whose operation is controlled by control data stored therein. The graphics adapter has two sets of loadable control data, one of which is used by a graphics processor in the graphics adaptor and the other of which is used by the processor for the system in which the graphics adapter is used. Because each processor has its own set of control data, control of the graphics adapter is rapidly and easily switched between the processors. Included in the graphics adapter is graphics control apparatus which contains storage for two sets of control data and operates under control of one or the other of them as determined by signals from the graphics adapter. The graphics control apparatus further includes state storage for retaining state necessary for resumption of operation for one processor after the other has used the graphics adapter. The graphics control apparatus can perform both byte and word operations and can emulate byte operations while operating in word mode. Further, the graphics control apparatus may employ either an external or an internal mask to mask data.

37 Claims, 9 Drawing Sheets

GRAPHICS ADAPTER OF THE PRESENT INVENTION

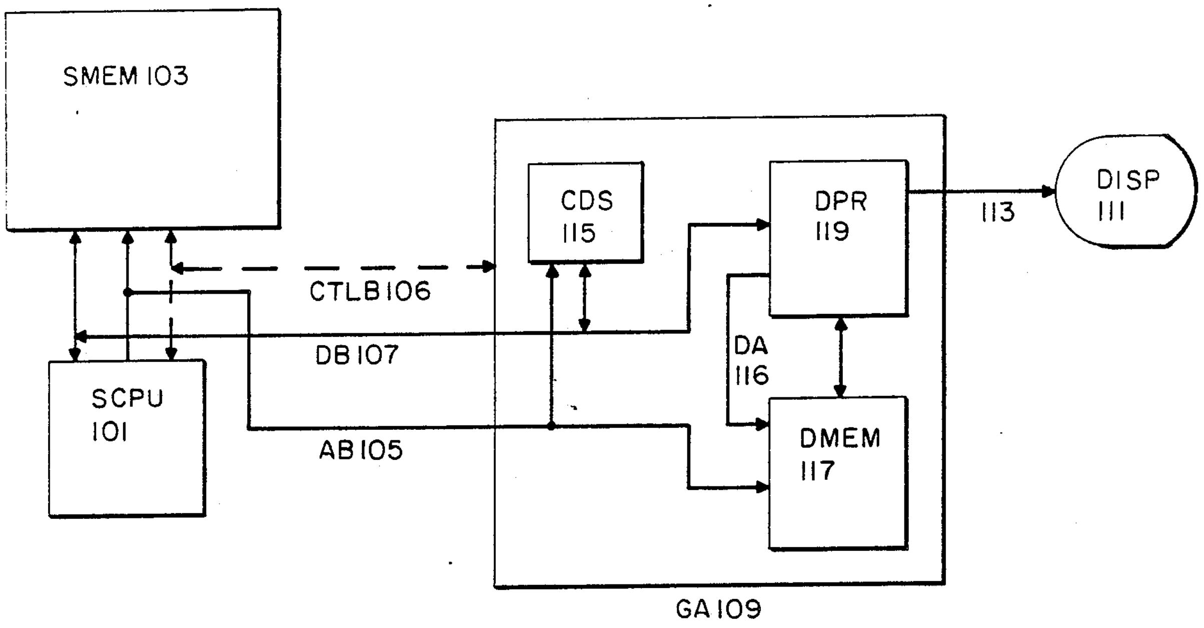
FIG. 1: COMPUTER SYSTEM WITH PRIOR-ART GRAPHICS ADAPTER
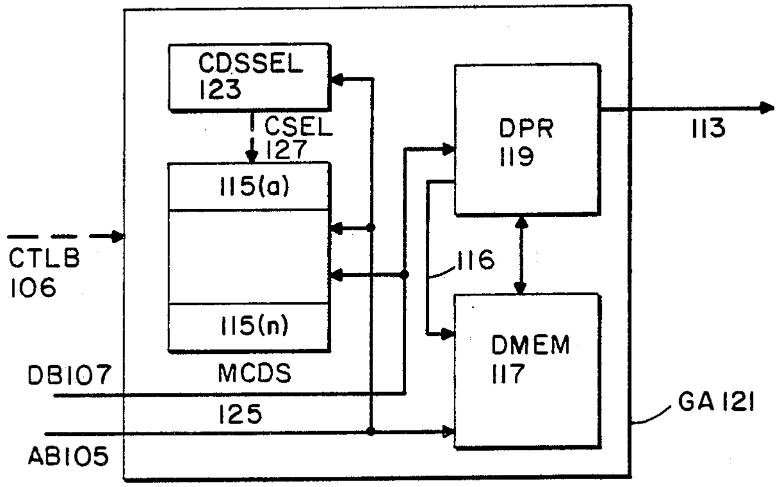
FIG. 1A: GRAPHICS ADAPTER OF THE PRESENT INVENTION

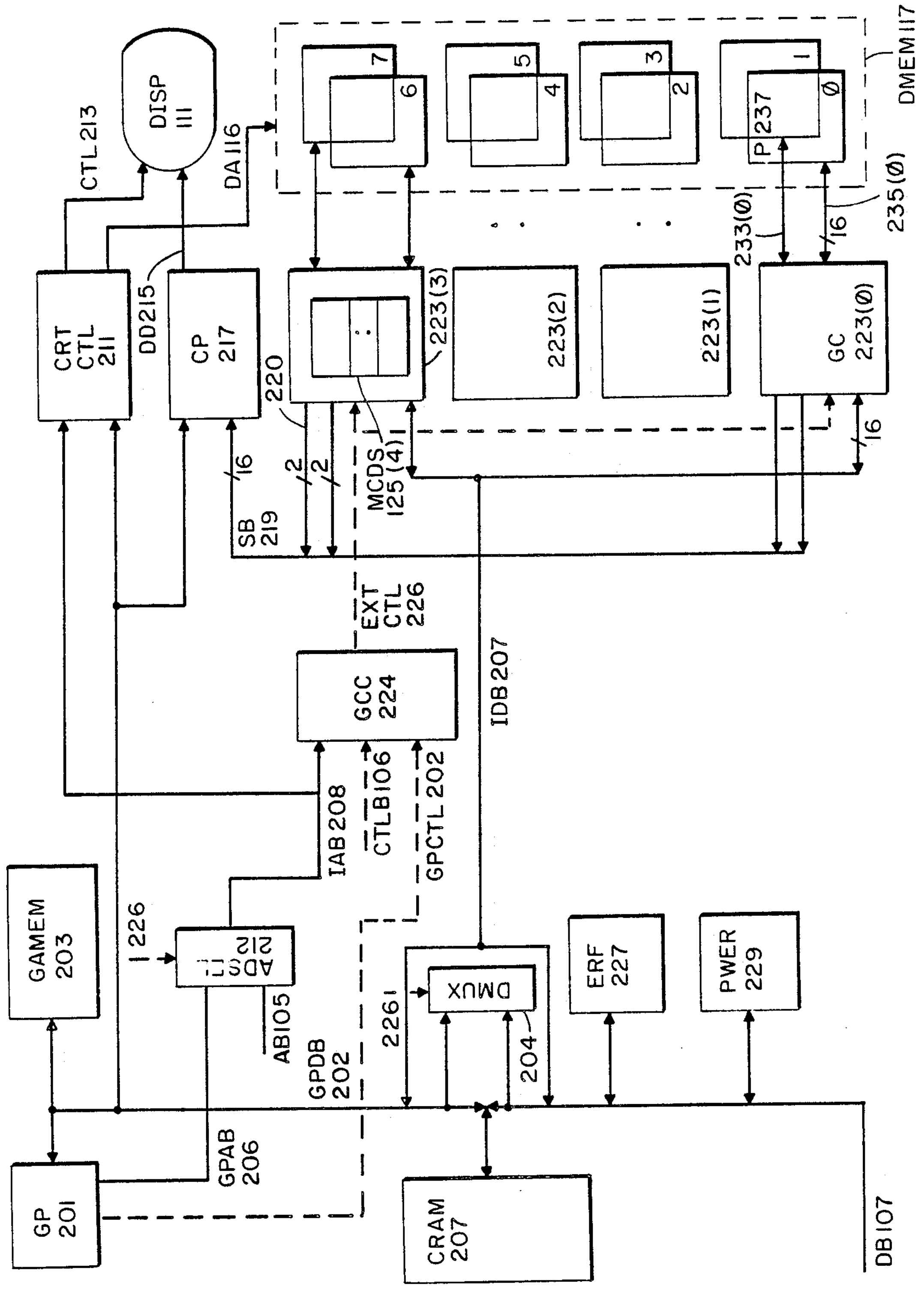
FIG. 2: GA 121 OVERVIEW

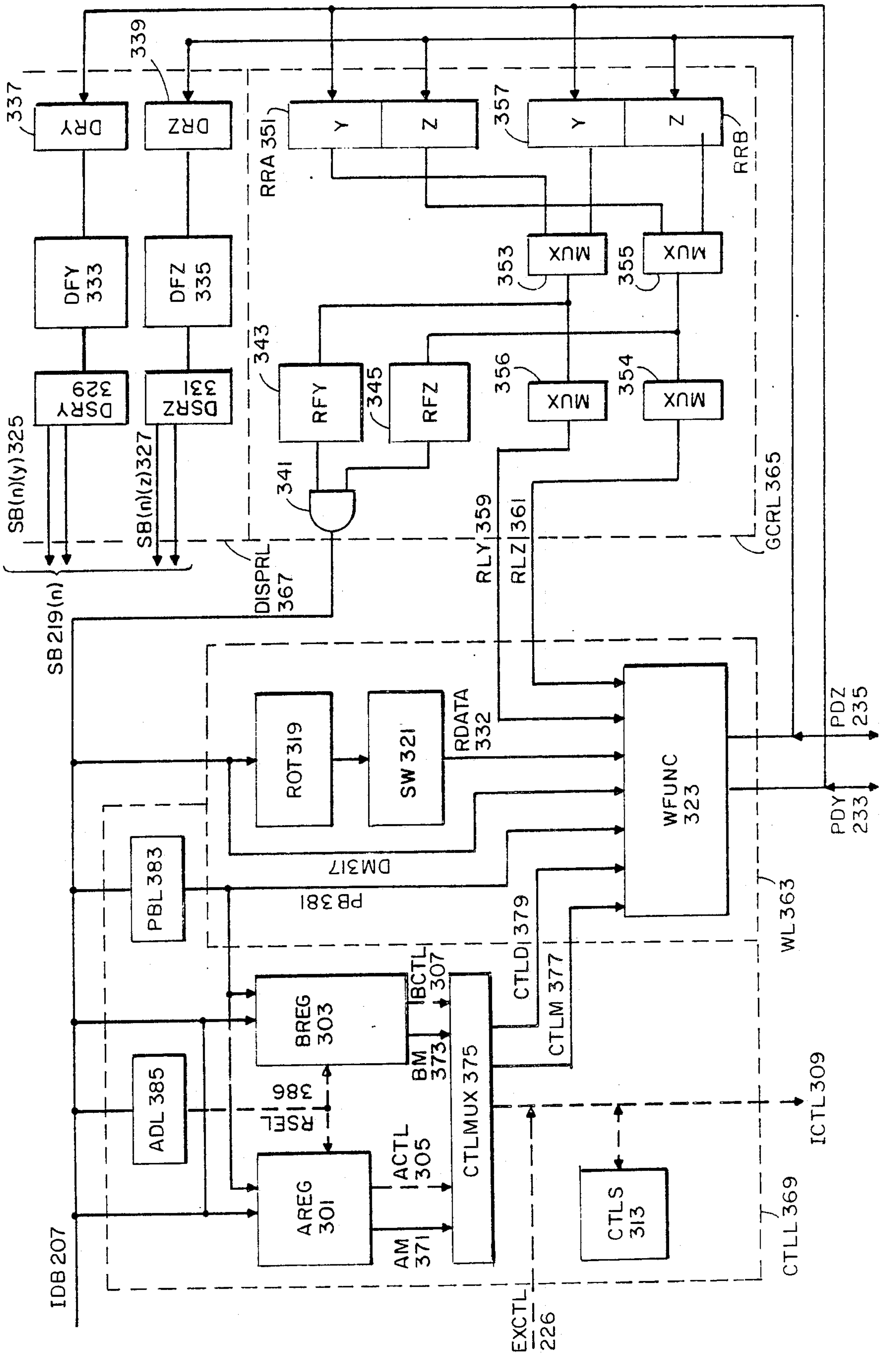
FIG. 3: DETAILED BLOCK DIAGRAM OF A PREFERRED EMBODIMENT OF GC223

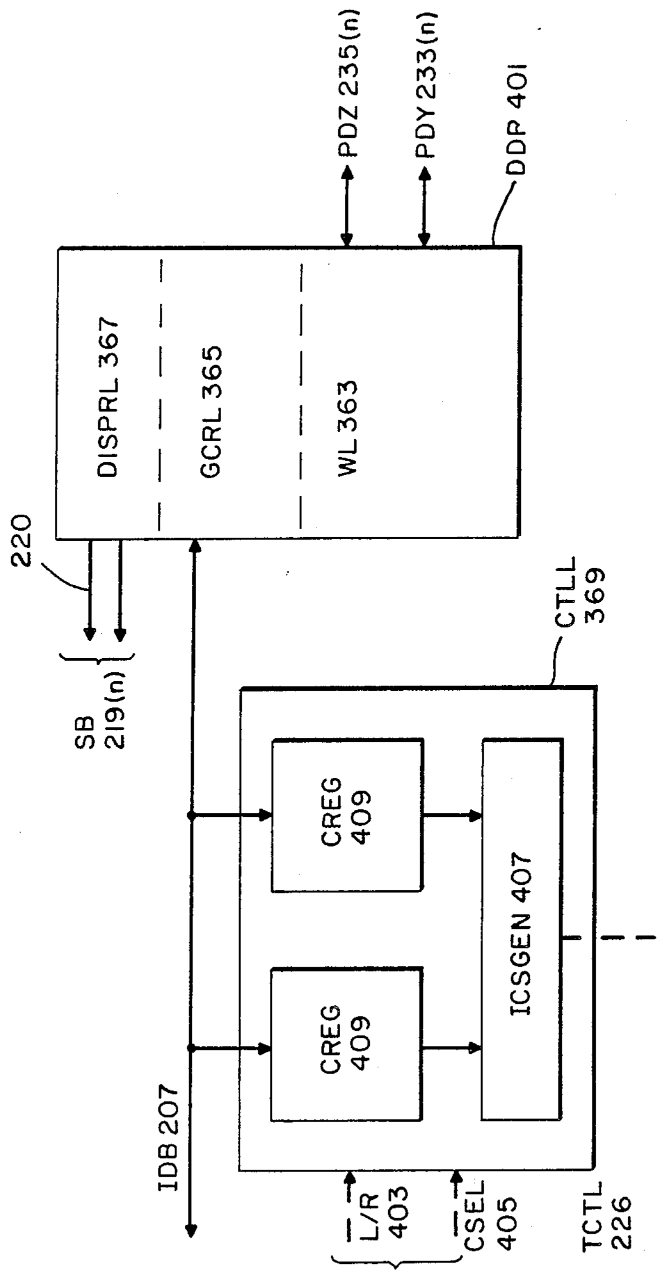
FIG. 4: GC 223 CONCEPTUAL BLOCK DIAGRAM

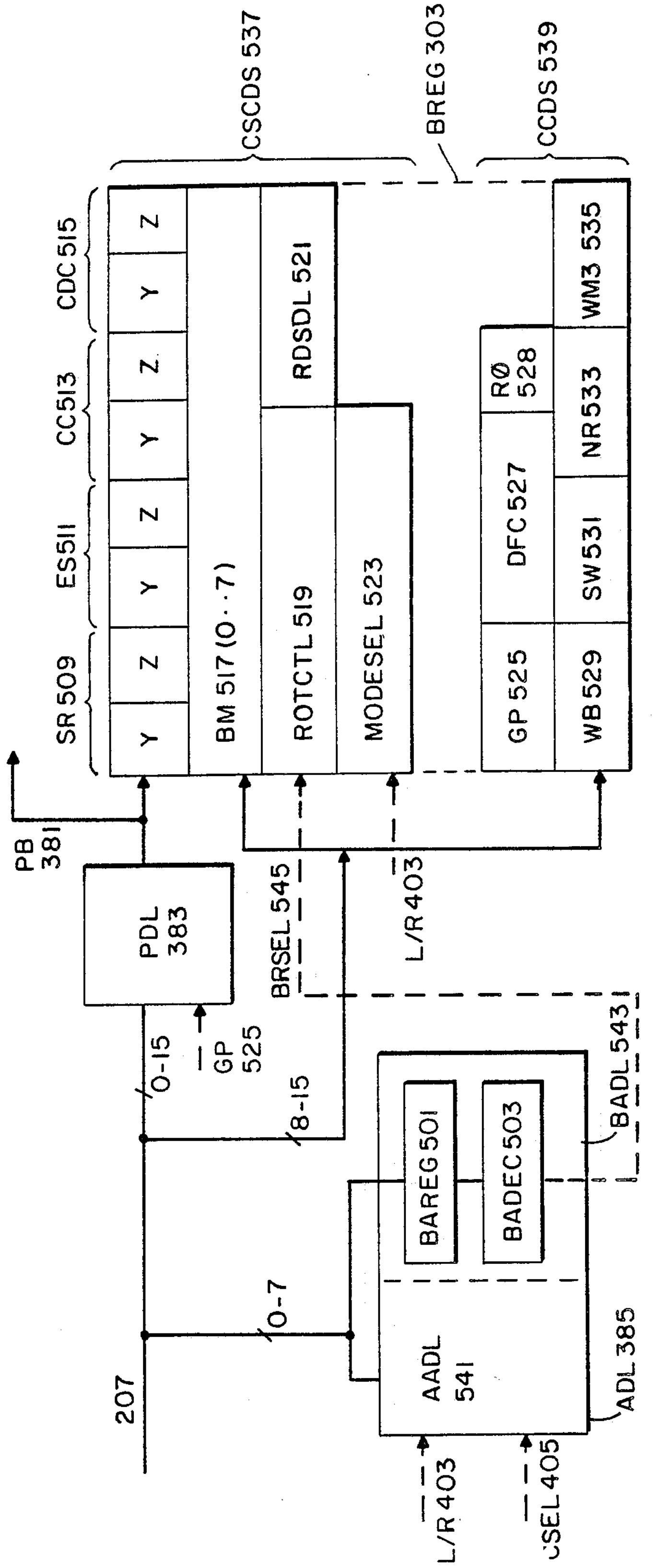
FIG. 5: BREG 303 DETAIL

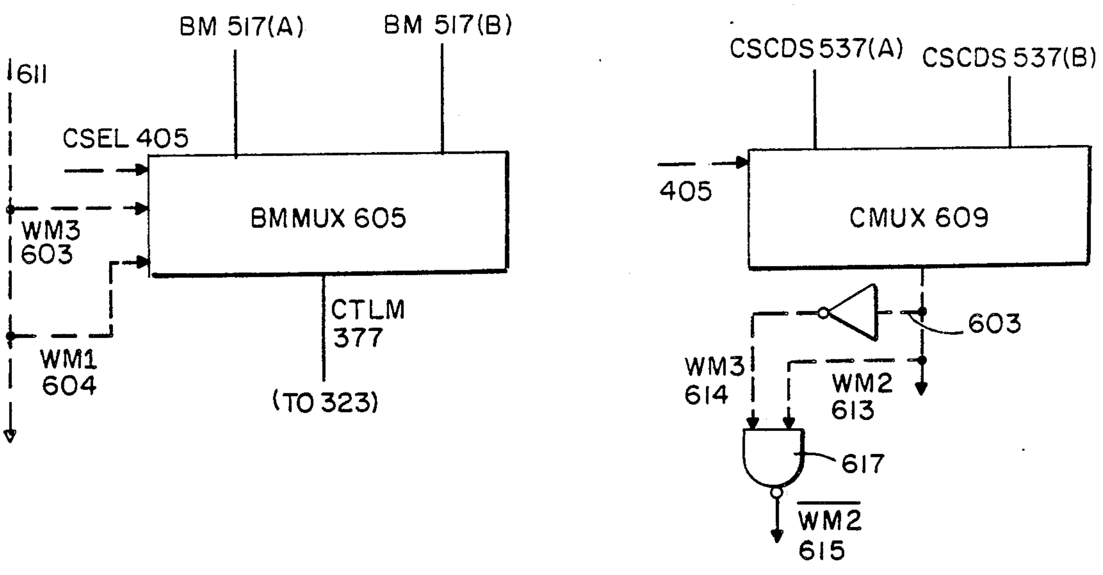
FIG. 6: DETAIL OF CTLMUX 375
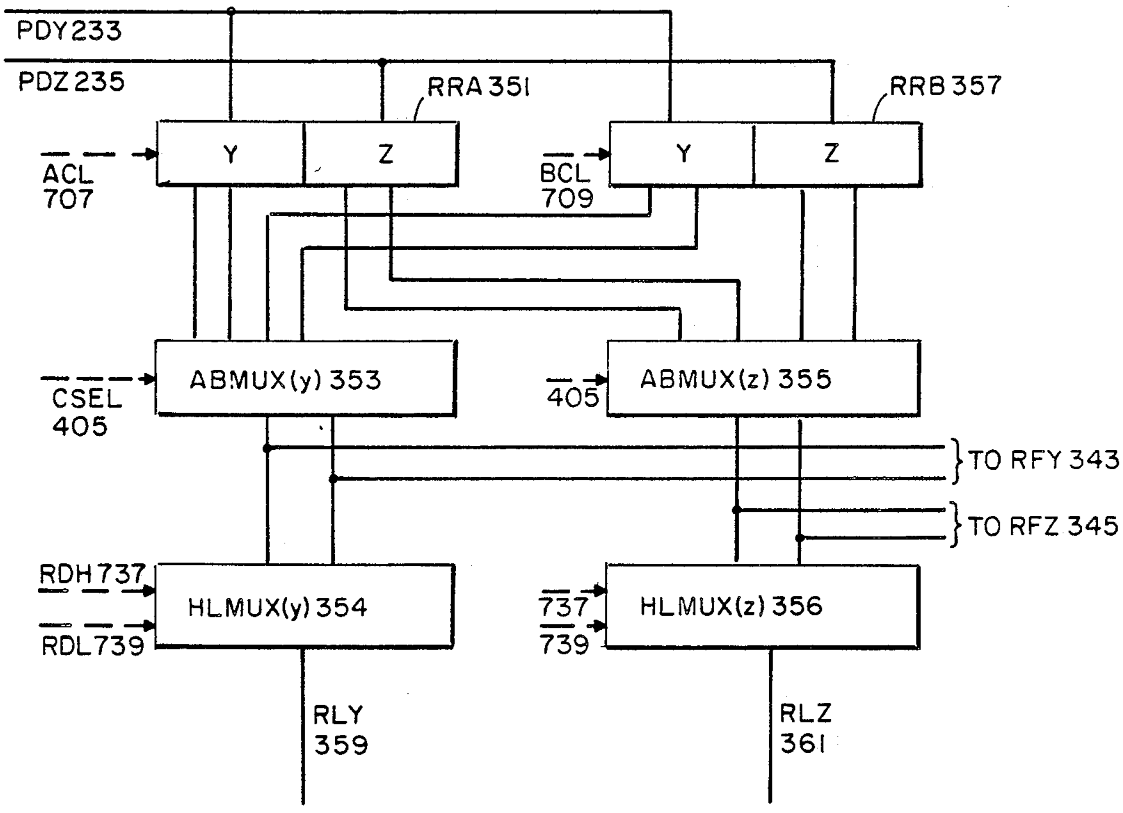
FIG. 8: DETAIL OF RRA351, RRB357, AND MUX 353

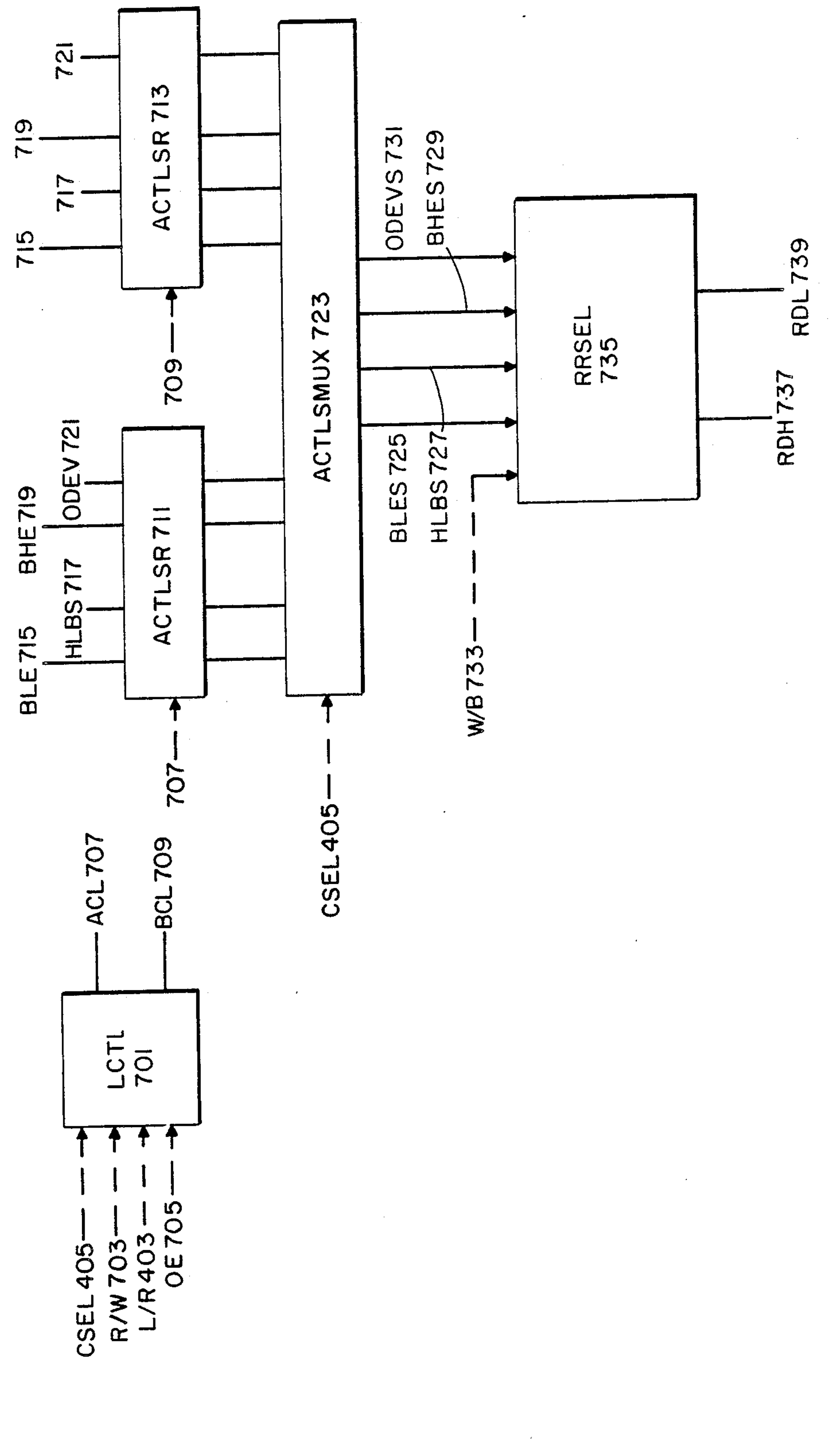
FIG. 7: CTLS 313 DETAIL

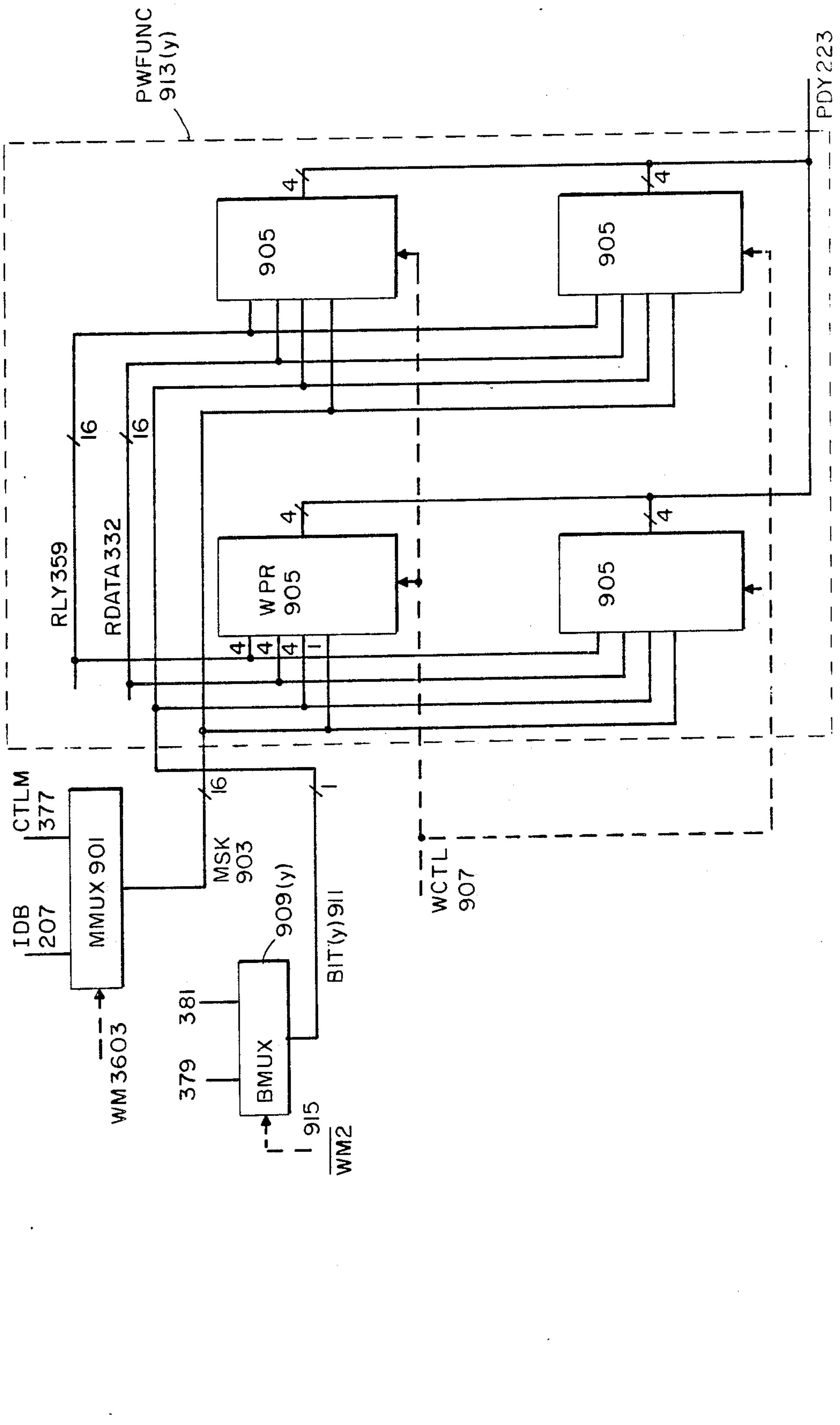
FIG. 9: WFUNC 323 OVERVIEW

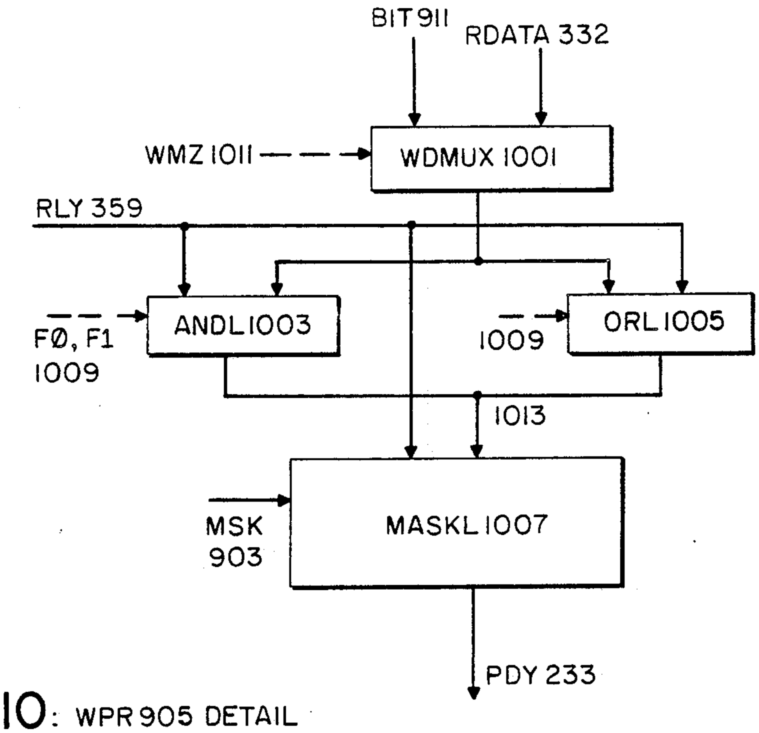
FIG. 10: WPR 905 DETAIL
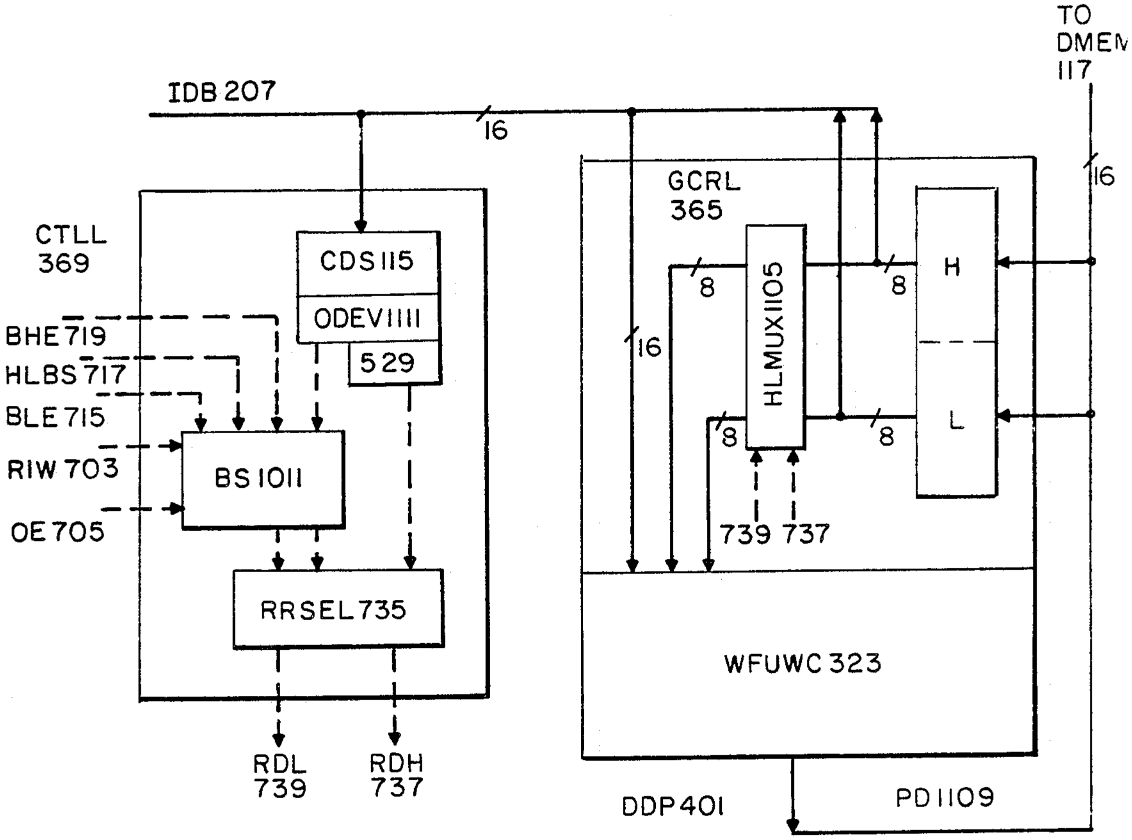
FIG. 11: CONCEPTUAL BLOCK DIAGRAM OF BYTE PROCESSING

GRAPHICS ADAPTER

BACKGROUND OF THE INVENTION

1. Field of the Invention

The present invention relates to digital computer systems and more specifically to apparatus used in digital computer systems to generate displays.

2. Description of the Prior Art: FIG. 1

It has long been the practice in computer systems to employ a separate subsystem to generate displays on a CRT. There are two reasons for so doing: to simplify the interface between the CRT and the computer system and to offload at least some of the processing involved in generating a display from the remainder of the computer system to the subsystem. One such separate subsystem which has been popular in recent years is the enhanced graphics adapter (EGA) card for the IBM personal computer, described in "Graphic Enhancement", in *PC Tech Journal*, vol. 3, no. 4, Apr. 1985, pp. 58-80. That article is hereby incorporated by reference into the present application.

FIG. 1 is a block diagram of a computer system employing a graphics adapter of the type of the EGA. The system contains system CPU (SCPU) 101, system memory (SMEM) 103, graphics adapter (GA) 109, and DISP 111. SCPU 101, SMEM 103, and GA 109 are connected by means of data bus (DB) 107, which transfers data between SCPU 101, SMEM 103 and GA 109, address bus (AB) 105, which provides addresses from SCPU 101 to SMEM 103 and GA 109, and control bus (CTLB) 106 which provides signals controlling the interaction of SCPU 101, SMEM 103, and GA 109. GA 109 is further connected to DISP 111. In this and the other figures of the present application, control signals are indicated by dashed arrows. GA 109 further contains display processor (DPR) 119, which processes data to be displayed on DISP 111, DMEM 117, in which the data to be displayed is stored, and a set of registers, CDS 115, which contain data which controls operation of DPR 119.

To a programmer of SCPU 101, GA 109 appears as an I/0 device. The programmer may specify CDS 115 as a destination for data and DMEM 117 as either a source of or destination for data. To operate GA 109, the programmer first loads CDS 115 with the control data required to cause DPR 119 to perform the proper operations and then either reads data from DMEM 117 or writes it to DMEM 117 as required to put the data in DMEM 117 into the proper form for display on DISP 111. In reading or writing the data, DPR 119 may perform logical operations on the data and operations such as swapping, rotating, or masking. In addition to processing data for DMEM 117, DPR 119 further provides display addresses (DA) 116 to DMEM 117. In response to those addresses, DMEM 117 outputs data for display on DISP 111 to DPR 119, which operates on the display data as specified by CDS 115 and then outputs it to a controller for DISP 111. References to DMEM 117 in response to addresses on AB 105 are interleaved with writes from DMEM 117 in response to DA 116. Consequently, a change in the contents of DMEM 117 as a result of an operation controlled by SCPU 101 is quickly reflected on DISP 111. Because operation of GA 109 is controlled by CDS 115, each time the program executing on SCPU 101 desires to perform a different graphics operation, it must reload CDS 115 with the control data required for the new graphics operation.

While graphics adapters of the EGA type are effective, they have a number of problems. One is that there is only a single CDS 115. Consequently, CDS 115 must be reloaded each time a new graphics operation is performed. In many cases, in fact only a small number of different graphics operations ar performed; nevertheless, CDS 115 must be reloaded each time, greatly reducing the speed of graphics operations Moreover, the single CDS 115 increases the difficulty of operations such as writing characters and performing vector graphics in the same display and writing simultaneously to two screens or to two windows in a screen. Another problem is that prior-art EGAs work only on 8-bit bytes, again slowing down the speed with which graphics operations can be performed. Finally, the only source for a mask in the masking operations is CDS 115, thus making it necessary to reload CDS 115 in order to change a mask. These problems and others are solved by the graphics adapter of the present invention.

SUMMARY OF THE INVENTION: FIG. 1A

The present invention relates to graphics adapters used to generate displays in computer systems. As shown in FIG. 1A, the graphics adapter (GA 121) of the present invention includes a plurality of CDSs 115 in multiple CDS (MCDS) 125 and CDS selection logic (CDSSEL) 123 for providing CSEL signal 127, which selects one of the CDSs 115 in MCDS 125. In response to CTLB 106, a given one of the CDSs 115 may be selected either for loading of control data or for use in controlling operation of GA 121. Consequently, when generation of a display involves repetition of a small number of graphics operations, one of the CDSs 115 may be loaded with the control data required for each operation and GA 121 can select the proper CDS 115 instead of reloading the single CDS 115 of the prior art. In some embodiments, the proper CDS 115 may be selected by the address on AB 105, i.e., DMEM 117 appears to the programmer of SCPU 101 as a plurality of sets of memory addresses. Each CDS 115 in MCDS 125 corresponds to one of the sets of memory addresses and defines the operations done on DMEM 117 when DMEM 117 is addressed with one of the corresponding sets of memory addresses. In other embodiments, signals on CTLB 106 may select a given one of CDS 115.

The plurality of CDSs 115 also makes it easier to use GA 121 in systems involving more than one processor. For example, some systems for doing graphics have a separate graphics processor in addition to SCPU 101. The separate graphics processor executes high level graphics instructions and responds to them by setting up CDS 115 as required to perform the operation specified by the high-level graphics instructions. In GA 121 of the present invention, the graphics processor and SCPU 101 may be assigned different sets of CDSs 115 in MCDS 125, the CDSs 115 loaded as required for the operations to be performed by the processors, and GA 121 can perform operations first for one processor and then the other without reloading MCDS 125 in between. Again, selection of a CDS 115 may be by address or by special control signals.

In a preferred embodiment of the invention, MCDS 125 and CDSSEL 123 are implemented in a number of graphics control circuits in GA 121. Each of the graphics control circuits performs operations on a portion of DMEM 117, and each has its own MCDS 125 and CDSSEL 123.

In another aspect of the invention, the graphics control circuitry is able to perform both the byte operations typical of the prior art and word operations. In a novel mode of operation, the graphics control circuitry is able to emulate byte operations while performing word operations.

In a further aspect of the invention, the graphics control circuitry employs a new mode of writing data to DMEM 117. In graphics control circuits in prior art EGAs, data being written to DMEM 117 could be masked using a mask stored in CDS 115; in the graphics control circuitry of the invention, the mask may be supplied directly via DB 107, thus eliminating the need to reload CDS 115 for certain masking operations.

It is thus an object of the invention to provide an improved display generating system for use in a computer system;

It is another object of the invention to provide an improved graphics adapter of the type in which control data controlling processing of display data is loaded into the graphics adapter prior to processing display data;

It is an additional object of the invention to provide an improved graphics adapter permitting loading of several sets of control data and selection among them for control of display data processing;

It is a further object of the invention to provide improved graphics control circuitry for use in a graphics adapter.

It is yet another object of the invention to provide graphics control circuitry containing several sets of control data and providing for selection among them for control of the operation of the graphics control circuitry;

It is a still further object of the invention to provide graphics control circuitry capable of performing word and byte operations; and It is a further additional object of the invention to provide graphics control circuitry having a write mode wherein masking data is provided from the data bus Other objects and advantages of the present invention will be understood by those of ordinary skill in the art after referring to the detailed description of a preferred embodiment and the drawings, wherein:

BRIEF DESCRIPTION OF THE DRAWINGS

FIG. 1 is a block diagram of a computer system with a prior-art graphics adapter (GA);

FIG. 1A is a high level block diagram of a GA 121 of the present invention;

FIG. 2 is an overview block diagram of a preferred embodiment of GA 121;

FIG. 3 is a detailed block diagram of a preferred embodiment of graphics controller (GC) 223;

FIG. 4 is a conceptual block diagram of GC 223;

FIG. 5 is a detail of BREG 303 of GC 223;

FIG. 6 is a detail of CTLMUX 375 of GC 223;

FIG. 7 is a detail of CTLS 313 of GC 223;

FIG. 8 is a detail of RRA 351, RRB 357, and MUX 353 of GC 223;

FIG. 9 is an overview of WFUNC 323 of GC 223;

FIG. 10 is a detail of WPR 905 of WFUNC 323; and

FIG. 11 is a conceptual block diagram of byte processing in GC 223.

Reference numbers employed in the drawings have three or four significant digits. The two least significant digits are a number in the drawing where the item identified by the number first appears; the most-significant digits are the drawing number; thus reference number 115 refers to an item first shown in FIG. 1 or 1A.

DETAILED DESCRIPTION OF A PREFERRED EMBODIMENT

The following detailed description of a preferred embodiment of the graphics adapter of the present invention will first discuss the graphics adapter and its operation and will then discuss the graphics controller used in the graphics adapter and its operation.

1. Graphics Adapter 121: FIG. 2

FIG. 2 is an overview block diagram of a preferred embodiment of graphics adapter (GA) 121. GA 121 is implemented on a single printed circuit board and is connected to SCPU 101 by means of DB 107, AB 105, and CTLB 106. In a preferred embodiment, GA 121 includes graphics processor (GP) 201, a 16-bit NEC V30 microprocessor manufactured by Nippon Electric Corporation and can perform operations under either the direct or indirect control of SCPU 101. Direct control is used for bit mapped graphics. In this form of control, SCPU 101 loads CDS 115 and specifies read and write operations and the relevant addresses in DMEM 117 itself. Indirect control is used for vector graphics, i.e., displays described by means of vectors. In this form of control, SCPU 101 provides high level vector graphics instructions to GP 201, which then loads CDS 115 and specifies the addresses in DMEM 117 and the read and write operations. Communication between GP 201 and SCPU 101 is by means of communications RAM (CRAM) 207, which is writable and readable by both processors. Selection of either SCPU 101 or GP 201 as the source of addresses is performed by address selection logic (ADSEL) 212, which receives addresses from SCPU 10 via AB 105 and from GP 201 via GPAB 206 and outputs the selected address via internal address bus (IAB) 208. Selection is controlled by signals in EXT CTL 226, as will be explained in more detail below. Selection of either SCPU 101 or GP 201 as the source of data to be written to DMEM 117 is made by DMUX 204, which receives data from GP 201 via GPDB 202 and from SCPU 101 via DB 107 and outputs the selected data to IDB 207. Selection is again controlled by signals in EXT CTL 226. SCPU 101 provides the graphics instructions to GP 201 by loading them into CRAM 20. GA memory (GAMEM) 203 contains data and programs for GP 201 and other data used to control display 111. Emulation register file (ERF) 227 is memory which contains an address translation table which permits GA 121 to emulate an IBM EGA. Plane write enable register (PWER) 229 contains bits which specify which portions of DMEM 117 may be written to.

Display 111 is controlled by CRT CTL 211 and receives the data it displays from Color Palette (CP 217), which determines the color which results from the display data. Control data required to operate CP 217 and CRT CTL 211 is received via GPDB 202 from GP 201; CP 217 receives the display data via SB 219. CRT CTL 211 provides addresses via DA 116 to DMEM 117. The addresses have two sources: IAB 208 and CRT CTL 211 itself. Addresses received from IAB 208 are for read and write operations performed by GA 121 on the contents of DMEM 117; those generated by CRT CTL 211 itself are for reading data from DMEM 117 for display on DISP 111. Addressing operations using addresses from SCPU 101 or GP 201 are interleaved with those using addresses generated by CRT CTL 211.

DMEM 117 consists of 8 planes P 237. Addresses supplied from CRT CTL 211 to DMEM 117 via DA 116 apply to all 8 planes at once. In the preferred embodiment, the address may specify either or both bytes of a 16-bit word. A picture element (PEL) appearing on display 111 is represented in DMEM 117 by 8 bits, one in each plane of DMEM 117. Displays are produced by setting the planes of DMEM 117 to the proper values, outputting bits from each plane, and combining the bits from the planes to form PELs.

Manipulation of the contents of DMEM 117 and output of the display data to CP 217 via 16-bit SB 219 is performed by four graphics controllers (GC) 223. Each GC 223 operates on two planes P 237 of DMEM 117. Inputs from which a GC 223 produces data to be written to DMEM 117 may come via 16-bit IDB 207, from DMEM 217, and from within GC 223 itself. GC 223 may also provide data from DMEM 117 to IDB 207, which in turn provides it to GP 201 or SCPU 101. In a write operation, data is written to both planes of DMEM 117 associated with GC 223 simultaneously; depending on the mode of the read operation, data may be read from one or both planes. Input from, and output to DMEM 117 is via one 16-bit bus for each plane. Buses for even planes have the reference number 235, and those for odd planes have the reference number 233. When data is written to display 111, the address on DA 116 specifies one word on all of the planes in DMEM 117. The word is output via bus 233 or 235 to the GC 223 for the plane, which formats the word and outputs it 2 bits at a time, one from the high byte and one from the low byte, via bus 220 for the plane to SB 219. Corresponding bits from each of the selected bytes are by this means output via SB 219 to CP 217, which thus receives the PEL for a given screen position, and that PEL, modified by the contents of CP 217, is output to DISP 111.

Control of each GC 223 and of DMUX 204 and ADSEL 212 is by means of EXT CTL signals 226 and a MCD 125 internal to the GC 223. EXT CTL signals 226 are generated by GC controller (GCC) 224 from bits of IAB 105, signals in CTLB 106, and signals on GPCTL 202 from GP 201. As specifically regards ADSEL 212 and DMUX 204, GPCTL 202 selects GP 201 or SCPU 101 as the source of data on IDB 207 and addresses on IAB 208. Since addresses for operations which modify DMEM 117 are interleaved with addresses for output of display data from DMEM 117 to DISP 111, EXTCTL 226 may simultaneously specify a read or write operation on DMEM 117 and display of data on DISP 111.

MCDS 125 contains a plurality of CDSs 115. The contents of a selected CDS 115 controls the operations which GC 223 performs on the data for its planes 237 of DMEM 117. EXTCTL 226 includes signals for selecting one of the CDSs 115 for loading from IDB 207 or for control of GC 223. When a CDS 115 is selected for loading, that CDS 115 is loaded with the same contents in each of the GCs 223; similarly, when a CDS 115 is selected for control, that CDS 115 is selected in each of the GCs 223. The CDSs 115 in all of the GCs 223 thus function as a single CDS 115 in GA 121. In a preferred embodiment, MCD 125 contains two CDSs 115, one reserved for SCPU 101 and the other for GP 201. Which will be used for a given operation is determined by a signal on GPCTL 202. Whenever the CDS 115 corresponding to one of the processors is selected, signals in EXT CTL 226 also cause ABSEL 212 to select the address provided by that processor and DMUX 204 to select the data provided by that processor. GA 121 may thus be seen conceptually as a GA with two channels, one for GP 201 and the other for SCPU 101. In other embodiments, there may be more CDSs 115 and consequently more channels, and more than one channel may be available to a processor.

Operation of GA 121 in a preferred embodiment is as follows: At the commencement of operation, GP 201 executes code which initializes GA 121. Once operation has commenced, CRT CTL 211 provides addresses to DMEM 117 for display of data on DISP 111. Bits from each plane are output as described above to the GC 223 for the plane, which then provides them to CP 217, which outputs them to DISP 111 to generate the display.

If a program executing on SCPU 101 wishes to inspect or modify DMEM 117 directly, it does in the same fashion as described for prior-art graphics adapter 109: it addresses CDS 115, loads it with the proper control data for the operation, and then performs a read or write operation on DMEM 117 as required. In GA 121, when SCPU 101 addresses CDS 115, GCC logic 22 enables loading of CDS 115 corresponding to SCPU 101 with data from DB 207, and when SCPU 101 addresses DMEM 117, GCC logic 224 enables addresses from AB 105 to go to CRTCTL 211.

If a program executing on SCPU 101 wishes instead to employ GP 201 to inspect or modify DMEM 117, it does so by writing the necessary graphics instructions to CRAM 207. GP 201 then executes the instructions by loading the control data required for the instructions into GP 201's CDS 115 and performing read or write operations as to perform the operations specified by the instructions. Selection of GP 201 as the source or destination for data and of addresses as well of CDS 115 corresponding to GP 201 is achieved by means of GPCTL 202, to which GCC 224 responds by selecting GPAB 206 as the address source, GPDB 202 as the data source, and GCS 115 corresponding to GP 201.

An advantage of multi channel GA 121 is that any part of DMEM 117 may be modified by either channel. It is consequently possible to use two different graphics techniques together in the same area of DMEM 117 to produce a display which combines both techniques. For example, if a graphics display which has alphanumeric labels is desired, GP 201's channel may be employed to develop the graphics component of the display, while SCPU 101's channel may be employed to produce the characters using bit-map techniques. In another embodiment, GA 121 may include a processor which provides high level character generation and may provide a channel for that processor. If all channels are employed by a single processor, the above advantages may be obtained if the single processor successively executes character generation and vector graphics generation software, using one of the channels for each.

Another advantage of multi-channel GA 121 is that channels may be used to write to different areas of DMEM 117. This capability permits a channel and in some cases a processor to be associated with a given area of DMEM 117. This association permits concurrent processing of more than one screen full of data in DMEM 117 or of several "windows" in a single screen.

2. Concept of Graphics Controller 223: FIG. 3

As is apparent from the above description of GA 121, processing of data in DMEM 117 and provision of data from DMEM 117 to CP 217 is actually performed by four GCs 223. FIG. 4 presents a conceptual block diagram of a single GC 223 in a preferred embodiment of GA 121. GC 223 has two main components: control logic (CTLL) 369, which controls operation of GC 223, and display data processor (DDP) 401, which processes display data from DMEM 401. CTLL 369 contains a plurality of sets of control registers (CREG) 409, each of which contains a CDS 115 for a channel. Input to the CREGs 409 is from IDB 207 and output is to internal control signal generator (ICSGEN) 407, which generates internal control signals (ICTLS) 309 for the devices in DDP 401. CTLL 369 further receives external control signals from EXCTL 226. Two of these signals are of particular interest in the present context: L/R 403, which determines whether GC 223 is to load data into CREGs 409 or to operate on data from DMEM 117, and CSEL 405, which selects which of CREGS 409 is to be loaded or is to control operation of DDP 401.

DDP 401 is connected to IDB 207, SB 219, PDZ 235 for GC 223's even plane, and PDY 233 for GCC 223's odd plane. DDP 401 provides data to and receives it from the processor or processors which control display 111, PDY 233 and PDZ 235 provide data to and receive data from their corresponding planes 237 of DMEM 117, and SB 219 receives bits from the planes for display on DISP 111. DDP 401 has three logical components: write logic (WL) 363, which processes data written to DMEM 117, GC read logic (GCRL) 365, which processes data read from DMEM 117 for internal use in GC 223 or return to the processor or processors via IDB 207, and display read logic (DISPRL) 367, which processes data read from DMEM 117 for display on DISP 111 and outputs it to SB 219.

Operation of GC 223 is as follows: before commencement of any operation, at least one CREG 409 must be loaded from IDB 207. During the loading operation, signals in EXTCTL 226 indicate a write operation, L/R 403 specifies a load operation, and CSEL 405 selects one of CREGs 409. Part of the data which appears on IDB 207 is interpreted as an address of a register in the selected CREG 409 and another part of the data is interpreted as the value to be loaded into the addressed register. In a preferred embodiment, IDB 207 is a 16-bit bus, and when a register in CREG 409 is being loaded, the low byte is the address of the register and the high byte contains the value to be loaded.

When the registers in CREG 409 required for the intended operation have been loaded with the proper values, signals in EXTCTL 226 indicate a read or write operation and may further indicate that the contents of DMEM 117 are to be output to DISP 111. L/R 403 specifies a run operation and CSEL 405 selects the CREG 409 for the operation. If output to DISP 111 is specified by EXTCTL 226, DISPRL 1367 processes the data being output from DMEM 117 to DISP 111 as specified by the selected CREG 409; if a read operation is specified, GCRL 365 processes the data being read from DMEM 117 to IDB 207 as specified by the selected CREG 409; if a write operation is specified, WL 365 provides data to DMEM 117 as specified by the selected CREG 409. If more than one CREG 409 has been loaded, operations may be switched simply by changing CSEL 405 to select a different CREG 409.

3. Detailed Discussion of a Preferred Embodiment of GC 223: FIG. 3

FIG. 3 is a detailed block diagram of a preferred embodiment of GC 223. Dashed boxes in the figure indicate what portions of the figure embody the conceptual components of FIG. 4. As will be explained in more detail below, the preferred embodiment writes words or bytes of data to DMEM 117 and reads words of data from DMEM 117 to IDB 207.

Beginning with CTLL 369, that portion of the preferred embodiment contains two sets of registers for CDSs 115. The first set of registers, AREG 301, contains CDS 115 for the channel reserved for SCPU 101, termed hereinafter the A channel; the second set of registers, BREG 303, contains CDS 115 for the channel reserved for GP 201, termed hereinafter the B channel, and further contains additional CDS 115 common to both channels. On loading, L/R 403 of EXTCTL 226 specifies loading and CSEL 405 selects one of AREG 301 or BREG 303. In the embodiment of FIG. 3, CSEL 405 is a single line whose binary value indicates which of AREG 301 or BREG 303 is to be selected. The following discussion will presume that BREG 303 has been selected. During loading, the data to be loaded is in the high byte of IDB 207 and the address of the register in BREG 303 to be loaded is in the low byte. Address logic (ADL) 385 receives the low byte, decodes it, and provides a signal via RSEL 386 which enables the selected register in BREG 303 to receive the data in the high byte of IDB 207. For some operations, bits are loaded on a per-plane basis; in these cases, plane bit logic (PBL) 383 provides the bits. The bits from PBL 393 are input to AREG 301 or BREG 303 via PB 381.

Output from AREG 301 or BREG 303 for channel-specific CDS 115 is to control mux (CTLMUX) 375, which responds to signals derived from EXTCTL 226 to select channel-specific output from AREG 301 or BREG 303 as specified by CSEL 405. The outputs from either AREG 301 or BREG 303 to CTL MUX 375 consist broadly of a mask (AM 371 and BM 373) and control data (ACTL 305 and BCTL 307). The selected mask is output from CTLMUX 375 via CTLM 377 to WFUNC 323; the selected control data goes in part to internal control signals (ICTL) 309 and in part as control data (CTLD) 379 to WFUNC 323. As shown in FIG. 3, other components of ICTL 309 come from EXCTL 226 and from control state logic CTLS 313. For some operations in a preferred embodiment, it is necessary to retain the state of the preceding operation in the channel and use that state in the production of ICTL 309. That state for both channels and the logic used to select state for one channel and make signals in ICTL 309, is in CTLS 313.

Continuing with WL 363, WL 363 produces 16 bits of data which GC 223 writes to its two planes 237 of DMEM 117. WL 363 has three main components, all of which operate under control of CDS 115 for the selected channel. ROT 319 rotates words of data received from IDB 207; SW 321 swaps the bytes of the data received from ROT 319. WFUNC 323 does the remainder of the processing required to produce data for DMEM 117. As may be seen from FIG. 3, WFUNC 323 receives its inputs from the following 7 sources:

CTLM 377 carries an 8-bit mask for the selected channel from AREG 301 or BREG 303;

CTLD 379 carries control data for the selected channel from CDS 115;

PB 381 carries plane bits selected from IDB 207 by PBL 383;

DM 317 receives a 16-bit data mask directly from IDB 207 for one mode of operation of WFUNC 323;

RDATA 322 receives 16 bits of data from IDB 207 which has been operated on by ROT 319 and/or SW 321; and RLY 359 and RLZ 361 carry 16 bits of data which has been read from the odd and even planes associated with GC 223.

As will be explained in more detail later, the operations performed by WFUNC 323 include producing words filled with 1's and 0's depending on values in the selected CDS 115 or provided by PBL 383, producing words containing the results of the rotate and swap operations performed by ROT 310 and SW 321, ANDing, ORing, or the words so produced with the 16 bits previously read from DMEM 117, and masking the results of those operations. The mask, which may be obtained either from CDS 115 for the selected channel, or from IDB 207, specifies for each bit in a word whether the bit is to come from the data read from DM 117 or from the data produced from CTLD 379, PB 381, RDATA 322, RLY 359, and RLZ 361 as described above. The word resulting from the operations is output via PDY 233 and PDZ 235 to the planes 237 of DMEM 117 with which GC 223 is associated. Depending on the address which DMEM 117 receives via IAB 208, either byte of the word or the entire word may be written to DMEM 117.

Continuing with GCRL 365, this portion of a preferred embodiment of GC 223 reads words from the associated planes via PDY 233 and PDZ 235 and provides them to IDB 207 and WFUNC 323. The data is received in read register for channel A (RRA) 351 or that for channel B (RRB) 357, depending on which channel is performing the read operation. Each of the read registers has a Y portion for receiving data from the Y plane and a Z portion for receiving data from the Z plane. On a read operation, the read register for the channel performing the operation receives the word from the corresponding plane 237 which contains the byte addressed by the address on IAB 208. The data in the read register is output to EDB 207 and to WFUNC 323 as determined by external signals in EXTCTL 226 and data in CDS 115 for the channel performing the operation.

Output from RRA 351 or RRB 357 to WFUNC 323 is via muxes 354 and 356. Depending on the external signals and the data in CDS 115, WFUNC 323 may receive 16 bits as follows:

the 16 bits contained in the read register for the channel;

16 bits consisting of 2 copies of the low byte in the read register for the channel; and 16 bits consisting of 2 copies of the high byte in the read register for the channel.

Output from RRA 351 or RRB 357 to IDB 207 is via read functions for each plane, RFY 343 and RFZ 345, and AND gate 341. Moreover, IDB 207 has open collector outputs, and consequently, when more than one GC 223 in a GA 121 is outputting to IDB 207, the outputs are wire ANDED together. The functions performed by RFY 343 and RFZ 345 include swapping the high and low bytes received from the read register, outputting data only from the portion of the selected read register which contains data from a selected plane 237, and, in one read mode, performing a color compare on the word being output. Output words from the two planes are ANDed at logic 341 add the resulting word is output to IDB 207.

DISPRL 367, finally, provides bits from which the display in DISP 111 is generated from the planes 237 associated with GC 223. The components of DISPRL 367 for plane 237 (Z) are display register (DRZ) 339, which receives 1 word at a time from plane 237(Z), display function (DFZ) 335, which aligns the received word, and display shift register (DSRZ) 331, a shift register which shifts the word as operated on by DFZ 335 onto SB 219. The shift is performed on the high and low bytes of the word simultaneously, i.e., corresponding bits of the high and low bytes are output simultaneously onto SB 219. The components of DISPRL 367 for plane 237(Y), namely DRY 337, DFY 333, and DSRY 329 are identical to those for plane 237(Z). Loading of the shift registers and shifting of data out of them is controlled by external signals.

4. Detailed Description of BREG 303: FIG. 5

As previously explained, operation of GC 223 is controlled by CDS 115 contained in AREG 301 and BREG 303. AREG 301 and BREG 303 each contain channel specific CDS 115 for their associated channels, and BREG 303 further contains common CDS 115. Details of BREG 303 and of the logic controlling loading of BREG 303 and AREG 301 are shown in FIG. 5.

Registers in AREG 301 and BREG 303 are addressed by means of bits 0–7 of IDB 207 provided to address logic (ADL) 385. In a preferred embodiment, only bits 0–3 are actually used for addressing. As shown in FIG. 5, ADL 385 is subdivided into AADL 541, the address logic for the A channel, and BADL 543, the address logic for the B channel. Since the implementation is the same for both, only BADL 343 is shown in detail. BADL 543 has two components: B address register (BAREG) 501 and B address decoder (BADEC) 503. BAREG 501 is loaded with bits 0–3 of IDB 207 in response to L/R 403 indicating load and to CSEL 405 indicating channel B. In response to those same signals, BADEC 503 decodes the contents of BAREG 501 to produce B register select signals (BRSEL) 545 of RSEL 386, which enable writing to the individual registers addressed by the contents of BAREG 501.

BREG 303 contains registers for two classes of CDS 115: channel specific CDS (CSCDS) 537, which is specific to channel B, and common CDS (CCDS) 539, which is common to both channels. AREG 303 also contains A channel registers for CSCDS 537 and for WB 529, SW 631, NR 533, and WM3 535 of CCDS 539; GP 525, DFC 527, and R0 528 are contained only in BREG 303. Conceptually, all of CCDS 539 belongs to BREG 303 in that its values may be set in a preferred embodiment only by GP 201. Data for the registers in BREG 303 comes from two sources: directly from bits 8–15 of IDB 207, and indirectly from those same bits via PDL 383. As will be explained in more detail later, some registers of CSCDS 537 control operations on individual planes 237. Which planes are to be operated on is indicated by bits 8–15 of IDB 207. PDL 383 receives these bits together with graphics position (GP) signals 525, which indicate which of the four GCs 223 in GA 121 the GC 223 receiving the signal is. In response to GP 525 and to bits 8–15 of IDB 207, PDL 383 sets the relevant register of CSCDS 537 as required for that GC 223.

Understanding of the contents of BREG 303 will be aided by a short overview of the operations performed by GC 223 under its control. There are two read modes for reading words from DMEM 117 to IDB 207. In read mode 0, words are read from one plane 237 to IDB 207. GC 223 performs the operation only if it is associated with the selected plane 237. In read mode 1, words are read from all planes 237 and a color compare may be performed for each plane 237. The outputs from each plane in a given GC 223 are ANDed together to produce the output for that GC 223 and outputs from all GCs 223 are wire ANDed together to produce the value output to IDB 207. As a side effect of a read operation, RRA 351 or RRB 357 for the channel being read is loaded with 1 word of data from DMEM 117; this data may then be used in write operations, as will be described in more detail below.

There are four write modes for writing words or bytes to DMEM 117. In each mode, WFUNC 323 in a preferred embodiment provides 16 bits of data to DMEM 117; whether a word or byte is written depends on the address provided by CRT CTL 211 to DMEM 117. In write mode 0, each externally enabled plane 237 is written with data produced by WFUNC 323 from RDATA 322; in write mode 1, each externally enabled plane 237 is written with data produced using data from RRA 361 or RRB 357; in write mode 2, the entire byte or word written to each externally enabled plane 237 is set to the value of the bit on IDB 207 8–15 corresponding to the plane; in novel write mode 3, finally, whatever data was produced by write modes 0 or 1 is masked by the 16 bits currently on IDB 207. Write modes 2 and 3 are mutually exclusive in a preferred embodiment. There is only a single video mode for writing data to DISP 111. Additionally, WFUNC 323 may emulate operations which write bytes of data while in fact writing words.

Turning to the contents of CSCDS 537, SR 509, ESR 511, CC 513, and CDC 515 are each two bit registers containing plane control data. Accordingly, each of these registers receives its value from PDL 383. When the register is loaded, bits 0–7 of IDB 207 specify the register and bits 8–15 indicate whether the register for a given plane is to be set. In write mode 0, the values in set/reset (SR) registers 509 indicate whether the words or bytes manipulated by WFUNC 323 are to contain all 1's or all 0's prior to being ANDed or ORed with the data from RRB 357 and masked. SR 509(Y) contains the data for the odd plane 237 and SR 509(Z) contains the data for the even plane 237 associated with GC 223. If SR 509 for a plane 237 is set to 1, the words or bytes to be manipulated for that plane will contain all 1's; if it is set to 0, they will contain all 0's. The values in enable set/reset registers (ESR 511) indicate whether the values in the corresponding registers of SR 509 will have the effect described above, or whether WFUNC 323 will ignore them. In the latter case, WFUNC 323 takes the data to be manipulated and written to the plane 237 from RDATA 322. Thus, if ESR 511(Z) is set to 0, the data for plane 237(z) will be taken from RDATA 322.

In read mode 1, color compare registers (CC) 513 and color don't care registers (CDC515) perform functions similar to those performed by SR 509 and ESR 511 and are set in the same fashion. In the applicable read mode, bytes or words are output from each associated plane 237. Each bit of the byte or word being output for a given plane 237 is compared with the bit contained in CC 513 for the plane. If the bit is equal to the bit in GC 513, the corresponding bit of the byte or word output to IDB 207 is set to 1; if not, the bit is set to 0. The function is useful for locating the beginning of an area in DMEM 117 whose PELs indicate a different color. CDC 515 enables and disables the corresponding CC 513. When CDC 515 for a plane is set to 1, the output value in the applicable read mode is governed by CC 513, as described above; when CDC 515 is set to 0, the output value is 1 regardless of the value of CC 513.

The remaining registers in CSCDS 537 and CCDS 539 are loaded directly from the most significant 8 bits of IDB 207. BM 517 is an 8-bit bit mask. In write modes 0, 1, and 2, the mask is provided to WFUNC 323, which makes a 16-bit mask containing two bytes of the contents of BM 517 and uses it to select bits from the words processed by WFUNC 323 and from RRB 357. Where a bit in the mask is 0, the corresponding bit in the data written to DMEM 117 comes from RRB 357; where it is 1, the corresponding bit is from the value processed by WFUNC 323. ROTCTL 519 contains 5 bits. Three of those control the rotation of the data which GC 223 receives in write mode 0 in ROT 319; the other two are used in write mode 0 and 1 to control whether WFUNC 323 passes the data it produces through to the mask unmodified, whether it ANDs the data with data from RRB 357, whether it ORs the data with that from RRB 357, or whether it XORs the data with that from RRB 357.

RDSEL 521 is a three bit register which indicates which of the 8 planes 237 is being read in read mode 0. A given GC 223 operating in read mode 0 responds to a read signal in EXTCTL 226 only if the value in RDSEL 521 specifies a plane 237 associated with that GC 223. MODESEL 523, finally, is a five bit register whose values determine whether GC 223 is in read modes 0 or 1, write modes 0, 1, or 2, a test mode, or an even-odd read mode. The test mode is of no interest in the present context. In the even odd read mode, WFUNC 323 operates on the even bytes from both the Y and Z portions of the selected read register and outputs the result on PDZ 235 and on the odd bytes from both the Y and Z portions of the selected read register and outputs the result on PDY 233.

Continuing with CCDS 539, the values in these registers control GC 223 regardless of what channel is controlling the read or write operations. In a preferred embodiment, only GP 201 may load BREG 303, and consequently, only GP 201 may set these values. Graphics position (GP) 525 is a two bit register which is set to indicate which GC 223 in GA 121 a given GC 223 is. As indicated in the discussion of CSCDS 537, signals produced from GP 525 are used by PDL 383 to determine which data bits to respond to in setting SR 509, ESR 51, CC 513, and CDC 515. The signals are further used by GCRL 365 to determine how GC 223 is to respond to RDSEL 521. DFC 507 is a three-bit register which indicates which of eight data alignment modes is to be carried out by DISPRL 367 on data written from DMEM 117 to DISP 111. R0 528 is a single-bit register. When it is set to 0, operation of DISPRL 367 is controlled both by a signal in EXTCTL 226 and the contents of DFC 527; when R0 528 has the value 1, DFC 527 alone controls DISPRL 367.

The remaining registers in CCDS 539 are all two bit registers which contain 1 bit for each channel. While both bits must be loaded by GP 201, the bit for channel A is actually stored in AREG 301 and that for channel B in BREG 303. The bit for a given channel is selected by CTLMUX 375. In word/byte register (WB) 529, if the bit for the channel is set to 0, WFUNC 323 performs word operations which emulate byte operations; if it is set to 1, it performs ordinary word operations. In swap register (SW) 531, if a channel's bit is set, SW 321 swaps low and high bytes on words input from IDB 207 to WFUNC 323 for write operations and RFY 343 and RFZ 345 swap high and low bytes on words output from GCRL 365 to IDB 207. In no read register (NR) 533, when the bit for a channel is set, a read operation performed by the channel outputs all 1's on IDB 207. In word mode 3 register (WM3) 535, if a channel's bit is set, write operations for that channel are performed using a 16-bit mask from IDB 207.

Operation of a preferred embodiment of GC 223 will generally be clear from the description of FIG. 3 and the description of the contents of BREG 303 and their meanings. After processors GP 201 and SCPU 101 have loaded AREG 301 and BREG 303 respectively, GC 223 will respond to signals in EXTCTL 226 specifying a read operation and selecting a channel as specified by RDSEL 521, CC 513, CDC 515, and MODESEL 523 of CSCDS 53 for the selected channel and as further specified by GP 525, SW 531, and NR 533 in CCDS 539. Similarly, GC 223 will respond to signals in EXTCTL 226 specifying a write operation and selecting a channel as specified by SR 509, ESR 511, BM 517, ROTCTL 519, and MODESEL 523 for the channel and as further specified by GP 525, WB 529, SW 531, and WM 3 535 in CCDS 539. Where a write operation involves data read from DMEM 217, that data will be taken from RRA 351 or RRB 357 corresponding to the selected channel. Interleaved video operations reading data to DISP 111 will be controlled by DFC 527 and R0 528.

5. Details of Channel Selection in GC 223: FIGS. 6–8

As previously mentioned, information required to perform operations for a given channel in GC 223 is contained in CSDS 537 for the channel in AREG 301 or BREG 303, in CCDS 539 of BREG 303, in CTLS 313, and in RRA 351 or RRB 357 for the channel. The following discussion will show in detail how the information is selected when an operation is being performed for a given channel.

FIG. 6 is a detail of CTLMUX 375 in a preferred embodiment. CTLMUX 375 has two components: BMMUX 605, which selects BM 517 from either AREG 301 or BREG 303, and CMUX 609, which selects CSCDS 537 and the relevant bit of WB 529, SW 531, NR 533, and WM3 in CCDS 539 from either AREG 301 or BREG 303. Those portions of CCDS 539 which are not channel specific bypasse CTLMUX 375. BMMUX 605 outputs the selected 8-bit mask to CTLM 377, which provides the mask to WFUNC 323. Selection of BM 517(A) or BM 517(B) is controlled by three signals: CSEL 405, specifying either the A or B channel, WM3 603, derived from WM3 535 for the selected channel, and WMI 604, derived from MODESEL 523 from the selected channel. As shown in FIG. 3, WM3 603 and WM1 604 are included on RCTL 611 of ICTL 309 from CMUX 609. A given BM 517 is output to CTLM 377 only if GC 233 is in neither write mode 1 nor write mode 3 and the BM 517's channel is specified by CSEL 405. In the case of CMUX 609, the selection is controlled solely by CSEL 405, which selects the inputs from either AREG 301 or BREG 303. NAND Gate 617 produces NOT WM2 613 from inverted WM3 603 and WM2 613, which is from MODESEL 523. The effect of the logic is to keep NOT WM2 high as long as WM3 is high, i.e., to inhibit write mode 2 when write mode 3 applies.

Continuing with FIG. 7, that FIG. is a detail of control state (CTLS) 313, which retains per channel state indicating whether the last operation which read data into RRA 351 or RRB 357 corresponding to the channel was a word read, whether was an odd-even read operation, whether it was a byte read, and if it was, whether it read the low byte or the high byte. The state must be retained to deal with the situation in which a read operation is performed by one channel, loading RRA 351 or RRB 357 for the channel, and then, before a write operation using the read data can be performed, an operation is performed by another channel. When the first channel resumes operation, it uses the state for that channel in CTLS 313 to determine how the data in RRA 351 or RRB 357 for the channel is to be applied in WFUNC 323. CTLS 313 consists of the following components: each channel has a set of four registers, ACTLSR 711 for channel A and BCTLSR 713 for channel B which contain the state needed to properly read RRA 351 or RRB 357. Loading of the registers is controlled by latch control logic (LCTL) 701. Selection of the contents of the register corresponding to the channel currently controlling GC 223 is performed by ACTLSMUX 723. Output from that MUX is to read register select logic (RRSEL) 735, which generates RDH 737 and RDL 739 in response to the contents of the selected register and W/B 733, which is derived from the value of WB 529 for the controlling channel in CCDS 539. RDH 737 and RDL 739 then control whether the read register for the channel outputs its entire contents, 16 bits containing 2 copies of the high byte from the selected read register, or 16 bits containing 2 copies of the low byte from the selected read register to WFUNC 323.

Beginning with ACTLSR 711 and BCTLSR 713, each register contains the values of four signals, three, BLE 715, HLBS 717, and BHE 719, derived from EXTCTL 226, and the fourth, ODEV 721, derived from the odd/even bit in MODESEL 523 for the channel corresponding to the register. The signals have the following significance:

- BLE 715 and BHE 719: Together, these signals indicate what data is being provided to WFUNC 323 from the selected read register. If both are low, the entire contents are to be provided; if BLE only is low, two copies of the low byte are provided; if BHE only is low, two copies of the high byte are provided.
- ODEV 721: indicates whether an even odd read is being performed.
- HLBS 717: indicates in an odd-even read whether the low bytes or the high bytes of the odd or even word are being read.

These signals are loaded into ACTLSR 711 or BCTLSR 713 in response to ACL 707 or BCL 709. Those signals are in turn produced by latch control (LCTL) 701 in response to four other signals in EXTCTL 226. Two of these, CSEL 405 and L/R 403 have already been described; the other two have the following functions:

- R/W 703 indicates whether GC 223 is to perform a read or write operation.

OE 703 enables data to be latched into AREG 301 and BREG 303 from IDB 207 and into RRA 351 and RRB 357 from PDY 233 and PDZ 235.

LCTL 701 responds to these signals to produce ACL 707 when CSEL 405 specifies channel A, R/W 703 indicates a read operation, L/R 403 indicates that GC 223 is being run instead of loaded, and 0E 705 indicates that data is to be latched into RRA 351 or RRB 357. BCL 709 is produced under the same circumstances when CSEL 405 specifies channel B. Thus, ACTLSR 711 or BCTLSR 713 are loaded each time the channel with which the register is associated performs a read operation on DMEM 117.

Selection of the contents of ACTLSR 711 or BCTLSR 713 is performed by ACTLSMUX 723, which, as shown in FIG. 7, is in turn controlled by CSEL 405. Thus, when CSEL 405 specifies channel A, ACTLSMUX 723 selects ACTLSR 711. The selected values, shown in FIG. 7 as BLES 725, HLBSS 727, BHES 729, and ODEVS 731, are provided to RRSEL 735, which also receives W/B 733, derived from WB 529 for the selected channel. RRSEL 735 in turn controls RDH 737 and RDL 739 in response to those signals.

In a preferred embodiment, RDL 739 causes MUXes 354 and 356 to output the low byte of the word latched in the selected read register for the plane 237 corresponding to MUX 354 or 356 to the 8 low lines of RLY 359 or RLZ 361 or the high byte of the word to those lines. The former occurs when RDL 739 has the value 1 and the latter when it has the value 0. RDH 737 operates in corresponding fashion to output the high byte to the 8 high lines when it has the value 1 and the low byte to the 8 high lines when it has the value 0.

As previously indicated, the other portions of GC 223 which contain channel-dependent information are RRA 351 and RRB 357 of GCRL 365. These registers and the associated logic are shown in FIG. 8. RRA 351 is associated with the A channel and RRB 357 is associated with the B channel. Each register has two 16-bit portions: a Y portion which in a read operation receives the currently-addressed word in the odd plane 237 associated with GC 223 and a Z portion which receives the currently-addressed word in the even plane 237. The Y and Z portions are connected to PDY 233 and PDZ 235 respectively. Data is latched into RRA 351 in response to the ACL signal 707 and into RRB 357 in response to BCL 709. As previously explained, those signals are produced by LCTL 701 in response to the CSEL 405, R/W 703, L/R 403, and OE 705 external signals.

RRA 351 and RRB 357 output their data to ABMUX(Y) 353 and ABMUX(Z) 355. ABMUX(Y) 353 receives data from the Y portions of both RRA 351 and RRB 357 and ABMUX(Z) 355 receives data from the X portions of these registers. In each case, the data is output as a high byte and a low byte, shown by the two output paths from each portion. ABMUX(Y) 353 and ABMUX(Z) 355 are controlled by CSEL 405. When CSEL 405 specifies the A channel, both muxes take their input from RRA 351; when CSEL 405 specifies the B channel, both take their input from RRB 357. The outputs from ABMU(Y) 353 and ABMUX(Z) 355 go to RFY 343 and RFZ 345 and to HLMUX(Y) 354 and HLMUX(Z) 356, which output 16 bits consisting of the entire word, the high byte only, or the low byte only as determined by RDH 737 and RDL 739, as previously described. Output from muxes 354 and 356 is to WFUNC 323 via RLY 359 and RLZ 361.

CTLS 313 and HLMUX(Y) 354 and HLMUX(Z) 356 cooperate to provide the proper input from the selected read register to WFUNC 323 as follows:

Where the read operation was performed with the odd even bit in MODESEL 523 for the channel indicating sequential read, HLBS 717 has no effect. When WB 529 indicates byte emulation and BLE 715 and BHE 719 are both low, selecting a word, RRSEL 735 responds to the BLES 725, BHES 729, and ODEVS 731 for the channel by setting RDL 739 low and RDH 737 high, resulting in two copies of the high byte being received by WFUNC 323 for each plane. Where the same conditions regarding the odd-even bit and WB 529 hold, but BLE 715 only was low, RRSEL sets RDL 739 high and RDH 737 low, resulting in two copies of the low byte being received by WFUNC 323; similarly, if BHE 719 only was low, RRSEL 735 sets RDL 739 low and RDH 737 high, again resulting in two copies of the high byte being received by WFUNC 323. The fact that two copies of the high byte are received by WFUNC 323 when a word is selected permits WFUNC 323 to emulate byte operations by performing two of the operations in parallel on a word.

Where the above conditions hold, except that WB 529 does not specify byte mode emulation, BLE 715 and BHE 719 both low on the read operation results in RRSEL 735 setting RDL 739 and RDH 73 both to 1, resulting in the entire contents of the selected read register being provided to WFUNC 323. If only BLE 715 is low or only BHE 719, the results are the same as for the case when WB 529 specifies byte emulation.

When MODESEL 523 for the channel performing the read indicates an even-odd read, the values of W/B 733, BLES 725, and BHES 729 have no effect on RRSEL 735, and the values of RDH 737 and RDL 739 are determined solely by HLBSS 727. When HLBSS 737 selects the low byte, RDL 739 is high and RDH 737 is low, resulting in WFUNC 323 receiving two copies of the low byte of the read register for the channel performing the read. When HLBSS 737 selects the high byte, RDL 739 and RDH 737 have the opposite values, resulting in WFUNC 323 receiving two copies of the high byte.

6. Detail of WFUNC 323: FIGS. 9 and 10

As discussed previously in overview, WFUNC 323 produces the data written to the planes 237 of DMEM 117 associated with GC 223. As shown in FIG. 9, in a preferred embodiment, WFUNC 323 has as its components MMUX 901 and two identical sets of components for each plane, bitmux (BMUX) 909 and plane WFUNC (PWFUNC) 913. Of those, FIG. 9 shows only BMUX 909 and PWFUNC 913 for plane 237(Y). Each PWFUNC 913 contains four write processing components (WPR) 905, each of which receives 4 bits of input from RLY 359 and RDATA 332, 4 mask bits from MSK 903, and a single bit input from BIT 911 and processes four bits of the 16-bit word being output to plane 237 via PDY 233. Control of WPR 905 is by means of signals in WCTL 907.

Mask mux (MMUX) selects the mask used to mask the data produced by WFUNC 323. Mask sources are CTLM 377, carrying BM 517 for the selected channel 901 or IDB 207, carrying 16 mask bits input by the processor controlling GA 121. Selection is made according to WM3 signal 603, whose value depends on the value of the bit in WM3 535 corresponding to the selected channel. If the bit is high, MMUX selects 16 mask bits from IDB 207; otherwise, it selects the mask byte on CTLM 377. In the latter case, MMUX 901 makes the 16 bit mask by selecting the mask byte from CTLM 377 for both the high and low bytes, permitting emulation of byte mode operations on words. Output to the WPRs 905 is via MSK 903. Each of the WPRs 905 receives 4 bits of the mask.

Bit MUX (BMUX) 909(Y) selects the source of a single bit whose value is used in write modes 0 and 2 to form the entire word being written to plane 237(Y). In write mode 0, the source is SR 509 for the selected plane. In write mode 2, the source is PDL 383. The value of the bit output by PDL 383 in write mode 2 depends on a bit pattern in the low byte of IDB 207. If the bit pattern has a 1 in the bit position corresponding to a plane, words in the corresponding plane 237 are to be written with all 1 bits. If it has an 0 in that bit position, the words are to be written with all 0 bits. Logic in PDL 383 provides the proper bit value for the plane on PB 381. Selection is controlled by NOT WM2 signal 915, which is derived from MODESEL 523 and which selects PB 381 in write mode 2 and otherwise CTLD 379. Output to WPRs 905 is via BIT 911.

Continuing with FIG. 10, that figure is a detail of a single WPR 905 in PWFUNC 913(Y). Control signals in the following discussion are all from WCTL 907. Beginning with WDMUX 1001, that mux selects as its output either the 4 bits WPR 905 receives from RDATA 332 or 4 bits which are set to the value received on BIT 911. Control is via WM2 1011, which is derived from MODESEL 523 for the selected channel and which selects BIT 911 when MODESEL specifies write mode 2. ANDL 1003 and ORL 1005 are controlled by the two function select bits in ROTCTL 519 for the selected channel. The four possibilities are passing the data from WDMUX 1001 through unchanged, ANDing it with the data on RLY 359, ORing it with that data, and XORing it with that data. The result of the selected operation is output via bus 1013. MASKL 1007, finally, masks the 4 bits being output with the 4 bits received on MSK 903. If a bit position in MSK 903 has the value 0, the corresponding bit from RLY 359 is selected; if it has the value 1, the corresponding bit from bus 1013 is selected. The result of the masking is then output to PDY 233.

7. Byte Mode Emulation in GC 223: FIG. 11

As previously indicated, the EGA reads and writes bytes to and from DMEM 117; GC 223 in a preferred embodiment permits GA 121 to emulate the EGA by writing bytes to DMEM 117. Additionally, GC 223 permits GA 121 to write words to DMEM 117 and to write words while emulating byte writes FIG. 11 is a conceptual block diagram of those aspects of GC 223 which permit byte writes, word writes, and word writes which emulate byte writes. FIG. 11 shows those aspects only with regard to a single channel and a single plane; it should be remembered that in a preferred embodiment of GC 113, either channel may write to either or both planes.

The two major components of FIG. 11 are CTLL 369 and DDP 401, both of which already have been explained in detail. Only those portions of these components are shown in FIG. 11 which are necessary for understanding word and byte writes. In CTLL 369 there is CDS 115 for the channel in question. In CDS 115, only two values are of interest in the present context ODEV 1111, a bit in MODESEL 523 for the channel, which indicates whether GC 223 is to provided data from DMEM 117 to WFUNC 323 sequentially or in even-odd mode, and WB 529, which indicates whether GC 223 is doing word writes which emulate byte writes. Byte state (BS) 1101 preserves the control signals specified during a read operation for use in determining how data is to be output from the read register to WFUNC 323. In a preferred embodiment, BS 1101 receives the external signals BHE 719, BLE 715, and HLBS 717, as well as the current value of ODEV 111. The signals are latched into BS 1101 in response to R/W 703 specifying a write operation and OE 705 indicating that data is to be latched into the read register. BS 1101 in a preferred embodiment is implemented in LCTL 701 and one of ACTLSR 711 or BCTLR 713 as required for the channel. Output from BS 1101 is to RRSEL 735, which controls RDL 739 and RDH 737 as previously described. The use of BS 1101 in a preferred embodiment has two advantages: it permits multi-channel operation, as previously described, and it increases speed of operation of WFUNC 323 by permitting WFUNC 323 to receive data from RR 1107 without waiting for the state of EXTCTL 226 to settle.

In DDP 401, again, only those components relevant to word and byte writing are shown. In GCRL 365, those components are RR 1107, which is the read register for the plane and channel, andHHLMUX 1105, which is the byte selection mux for RR 107. L and H in RR 1107 indicate the low and high bytes respectively. RR 1107 receives 16 bits of input from DMEM 117 and provides it to HLMUX 1105, which then provides 16 bits of output to WFUNC 323. RR 1107 and HLMUX 1105 are implemented in a preferred embodiment by the portion of RRA 351 or RRB 357 for one plane and HLMUX 354 or HLMUX 356 for that plane. As indicated in the discussion of those components, the 16 bits output to WFUNC 323 may be both the low and high bytes from RR 107, 2 copies of the low byte, or two copies of the high byte, as determined by the values of RDL 739 and RDH 737.

When GC 223 is operating in byte mode, it may write to DMEM 117 either sequentially or in even-odd mode, as determined by ODEV 1111. When GC 223 operates sequentially in byte mode, one of BLE 715 and BHE 719 is high during the read opera ion and the other is low. The signal that is low determines which byte in RR 1107 is used in WFUNC 323 to process the byte which is written to DMEM 117. If BLE 715 is low and BHE 719 is high, the low byte is used; if the reverse is true, the high byte is used. In either case, HLMUX 1106 outputs 16 bits consisting of two copies of the selected byte to WFUNC 323, which uses the 16 bits to process the 16 bit output which it provides to PD 1109. The address provided to DMEM 117 for the write operation then determines which byte provided to PD 1109 is actually written to DMEM 117.

When GC 223 operates in even odd mode, it only performs byte operations. In that mode, HLBS 717 is low when the even byte is being read and high when the odd byte is being read. Output from HLMUX 1105 to WFUNC 323 for each plane 237 when HLBS 717 is low is two copies of the low byte in RR 1107; when HLBS 717 is high, the output is two copies of the high byte in RR 1107. Again, WFUNC 323 uses the output from HLMUX 1105 to process the 16 bit output which it provides to PD 1109 and the address provided to DMEM 117 for the write operation determines which byte on PD 1109 is written to DMEM 117.

GC 223 operates in word mode when ODEV 1111 indicates sequential addressing and BLE 715 and BHE 719 are both low. If WB 529 indicates that there is no byte mode emulation going on, RRSEL 735 sets RDH 737 and RDL 739 so that WFUNC 323 receives the entire 16 bits contained in RR 1107. WFUNC 323 then uses the entire 16 bits in processing its output to PD 1109, and if the address provided to DMEM 117 specifies an entire word, all 16 bits on PD 1109 are written to DMEM 117. If WB 529 indicates byte mode emulation, then RRSEL 735 sets RDH 737 and RDL 739 so that WFUNC 323 receives two copies of the high byte contained in RR 1107. WFUNC 323 can thus use the high byte to process two bytes in parallel. The results of the processing are output to PD 1109 and written to DMEM 117 as just described. Since the bytes can be processed in parallel, GC 223 can perform certain byte operations twice as fast as a graphics controller without byte mode emulation in word mode.

8. Implementation of a Preferred Embodiment of GC 223

The preferred embodiment of GC 223 as described herein is implemented in a custom CMOS gate array manufactured by LSI Logic Corporation. Components of GC 223 are made of macrocell elements as described in *CMOS Macrocell Manual*, Sept. 1984, LSI Logic Corporation, 1984. For example, the registers of AREG 301 and BREG 303 are made using D latch microcell elements of the type FD4S, while BMMUX 605 is made using macrocell elements of the type A02, in which the outputs of two AND gates serve as the inputs to a NOR gate. Other logic components of GC 223 as described herein may be readily made by one skilled in the art using the macrocell elements described in the above reference or other logic elements.

9. Conclusion

The foregoing Description of a Preferred Embodiment has disclosed how one skilled in the art may construct and use a graphics adapter having a plurality of channels and a graphics controller which may be employed in such a graphics adapter and which further operates in either word or byte mode and permits use of a word input as data to mask a value written to the display memory. While the embodiment disclosed herein is the best mode presently known to the inventor, other embodiments are possible. For example, the graphics adapter may be implemented on more than one card or may be implemented in an integrated circuit, and the graphics controller may be implemented in discrete logic or more than one controller may be implemented in a single integrated circuit. Moreover, the graphics adapter and graphics controller may permit use of more channels than in the preferred embodiment and may perform different operations from those described herein. Thus, the preferred embodiment described herein is to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. In graphics control apparatus used in a graphics adapter to process data from a display memory, the graphics control apparatus being of the type wherein a processing operation performed by the graphics control apparatus on the data from the display memory is controlled at least in part by a set of control data stored in the graphics control apparatus, the improvement comprising:

means for retaining more than one set of control data and control data selection means for selecting one of the sets of control data for control of the processing operation.

2. In the graphics control apparatus of claim 1 and wherein:

the control data selection means selects one of the sets of control data in response to an external control data selection signal.

3. In the graphics control apparatus of claim 1 and wherein:

the means for retaining more than one set of control data includes a plurality of separately-loadable control data set retention means; and the graphics control apparatus further includes loading means for receiving control data for loading; and selection means for selecting one of the control data set retention means to be loaded with the received control data.

4. In the graphics controller of claim 3 and wherein:

the loading means is responsive to an external load signal; and the selection means is responsive to an external control data selection signal;

5. In the graphics control apparatus of claim 3 and wherein:

the loading means receives the control data for loading from a source external to the graphics control apparatus.

6. In the graphics control apparatus of claim 1 and wherein:

the graphics control apparatus includes a set of control state for further controlling the graphics control apparatus associated with each of the sets of control data and means responsive to a first certain processing operation for setting the control state associated with the control data controlling the first certain operation as required by the operation; and the control data selection means responds to the selection of the control data controlling the first certain operation and to a second certain processing operation by selecting the control state associated with the selected control data and performing the second certain operation in accordance with the selected control state.

7. In the graphics control apparatus of claim 6 and wherein:

the first certain operation is a read operation reading data from the display memory; and the control state associated with a set of control data includes the last data read from the display memory by the read operation performed under control of the set of control data with which the control state is associated.

8. In the graphics control apparatus of claim 7 and wherein:

the read operation includes a plurality of types of read operations; and the control state further includes read operation type state indicating the type of read operation performed in the last display data read operation performed under control of the set of control data with which the control state is associated.

9. In the graphics control apparatus of claim 8 and wherein:

the second certain operation is a wire operation for producing display data to be written to the display memory.

10. In graphics control apparatus for use with a display memory permitting addressing of a single byte of n bits or a plurality of n-bit bytes, means for producing an m-bit result word where m/n is an integer for output to the display memory comprising:

read data receiving means connected to the display memory for receiving a first m-bit word from the display memory;

selection means connected to the read data receiving means for selecting an n-bit byte from the received word and forming an m-bit output word wherein each byte is identical to the selected byte; and write data processing means connected to the selection means and the display memory for receiving the output word, using the m bits therein to process the bytes of an entire second m-bit word in parallel to produce the m-bit result word, and outputting the result word to the display memory.

11. The means for producing a word of claim 10 and wherein:

the signal receiving means includes signal retention means for retaining a byte selection signal received when the read data receiving means receives the received word and means for controlling output of the selection means in response to the retained byte selection signal.

12. The means for producing a word of claim 10 and further comprising:

signal receiving means connected to the selection means for receiving a byte selection signal and controlling output of the selection means in response thereto.

13. The means for producing a word of claim 12 and wherein:

the byte selection signal is produced externally to the graphics control apparatus.

14. The means for processing a word of claim 12 and wherein:

the graphics control apparatus further includes loadable control data including byte selection control data; and the byte selection signal is produced in response to the byte selection control data.

15. The means for producing a word of claim 12 and wherein:

there are a plurality of byte selection signals including a word signal specifying all of the bytes in the received word; and a byte mode emulation signal specifying that all of the bytes in the result word are to be processed using a single byte of the received word; and the signal receiving means responds to the word signal and to the byte mode emulation signal by controlling the selection means to produce an output word consisting of copies of the single byte.

16. The means for producing a word of claim 15 and wherein:

the graphics control apparatus further includes loadable control data including byte mode emulation control data; and the byte mode emulation signal is produced in response to the byte mode emulation control data.

17. In graphics control apparatus which is used with a display memory and processes m-bit words for output to the display memory, emulation means for emulating the processing of n-bit bytes for output to the display memory where m/n is an integer, the emulation means comprising:

read data receiving means connected to the display memory for receiving a first m-bit word from the display memory;

selection means connected to the read data receiving means for selecting an n-bit byte from the received word and forming an m-bit output word wherein each byte is identical to the selected byte; and write data processing means connected to the selection means and the display memory for receiving the output word, using the m bits therein to process the bytes of an entire second m-bit word in parallel to produce an m-bit result word, and outputting the result word to the display memory.

18. In the emulation means of claim 17 and wherein:

the selection means selects the most significant byte.

19. In the emulation means of claim 17 and further comprising:

selection control means connected to the selection means and responsive to a byte mode emulation signal for causing the selection means to select the single byte in response to the byte mode emulation signal.

20. In the emulation means of claim 17 and wherein:

the graphics control apparatus further includes loadable control data including byte mode emulation control data and the byte mode emulation signal is produced from the emulation control data.

21. In graphics control apparatus for use with display memory and having an external data input for receiving external data, apparatus for providing output display data to the display memory comprising:

(1) internal data generation means for generating internal data, (2) display data input means for receiving input display data from the display memory, and (3) mask logic connected to the external data input, the internal data generation means, and the display data input means for using the external data as a mask for producing the output display data by selecting bits from the internal data generation means and the display data input means.

22. In the output display data providing apparatus of claim 21 and wherein:

the apparatus further includes means for retaining control data including a control mask and a write with external mask indicator; and the mask logic includes means connected to the means for retaining control data and responsive to the write with external mask indicator for using the external data input as the mask when the write with external mask indicator so indicates and otherwise using the control mask therefor.

23. In the output display data providing apparatus of claim 22 and wherein:

the external data input means and the display data input means, receive words containing m bits;

the control mask contains n bits, where m/n is an integer; and the mask logic further includes means for replicating the control mask (n/m) times in order to produce the mask when the control mask is used therefor.

24. In a graphics adapter which is used to process data from a display memory and which is of the type wherein a processing operation performed by the graphics adapter on the data from the display memory is controlled at least in part by a set of control data stored therein, the improvement comprising:

means for retaining more than one set of control data and control data selection means for selecting one of the sets of control data to control the processing operation.

25. In the graphics adapter of claim 24 and wherein:

the means for retaining more than one set of control data includes a plurality of separately-loadable control data set retention means; and the graphics control apparatus further includes loading means for receiving control data for loading; and selection means for selecting one of the control data set retention means to be loaded with the received control data.

26. In the graphics adapter of claim 25 and wherein:

the loading means receives the control data for loading from a source external to the graphics adapter.

27. In the graphics adapter of claim 26 and wherein:

the source external to the graphics adapter is an external processor associated with the graphics adapter.

28. In the graphics adapter of claim 24 and wherein:

the graphics adapter includes a set of control state for further controlling the graphics adapter associated with each of the sets of control data and means responsive to a first certain processing operation for setting the control state associated with the control data controlling the first certain operation as required by the operation; and the control data selection means responds to the selection of the control data controlling the first certain operation and to a second certain processing operation by selecting the control state associated with the selected control data and performing the second certain operation in accordance with the selected control state.

29. In the graphics adapter of claim 28 and wherein:

the graphics adapter includes a display memory for storing display data to be displayed on a graphics display;

the first certain operation is a read operation reading display data from the display memory; and the control state associated with a set of control data includes the last display data read from the display memory by the read operation performed under control of the set of control data with which the control state is associated.

30. In the graphics adapter of claim 29 and wherein:

the read operation includes a plurality of types of read operations; and the control state further includes read operation type state indicating the type of read operation performed on the last display data read operation performed under control of the set of control data with which the control state is associated.

31. In the graphics adapter of claim 30 and wherein:

the second certain operation is a write operation for producing display data to be written to the display memory.

32. In the graphics adapter of claim 24 and wherein:

the graphics adapter further includes an internal processor;

one of the sets of control data is reserved for use by the internal processor; and the control data selection means responds to the internal processor to select the set of control data reserved therefor.

33. In the graphics adapter of claim 32 and wherein:

the means for retaining more than one set of control data includes a plurality of separately-loadable control data set retention means;

a certain one of the control data set retention means is reserved for the internal processor; and the graphics adapter further includes loading means responsive to the internal processor for receiving control data and loading the received control data into the certain control data set retention means.

34. In the graphics adapter of claim 32 and wherein:

the graphics adapter is employed in a system having an external processor external to the graphics adapter; and a set of control data other than that reserved for the internal processor is reserved for the external processor; and the control data selection means responds to the external processor to select the set of control data reserved therefor.

35. In the graphics adapter of claim 34 and wherein:

the graphics adapter includes means by which the external processor provides instructions to the internal processor;

the internal processor responds to the instructions by employing the set of control data reserved for the internal processor to control the graphics adapter; and the external processor further controls the graphics adapter at times other than when the internal processor is in control thereof by employing the set of control data reserved for the external processor to control the graphics adapter.

36. In the graphics adapter of claim 35 and wherein:

the instructions to which the internal processor responds describe vector graphics operations; and the external processor performs bit-map graphics operations when the external processor is in control of the graphics adapter.

37. In the graphics adapter of claim 34 and wherein:

the means for retaining more than one set of control data includes a plurality of separately-loadable control data set retention means; and the internal processor has a control data set retention means reserved for that processor's use and the external processor has a control data set retention means reserved for that processor's use;

the graphics adapter further includes loading means responsive to the internal processor and to the external processor for receiving first control data for loading from the internal processor and loading the first control data into the control data set retention means reserved for that processor's use and receiving second control data for loading from the external processor and loading the second control data into the control data set retention means reserved for that processor's use.

* * * * *